United States Patent [19]
Gimlin et al.

[11] Patent Number: 5,093,842
[45] Date of Patent: Mar. 3, 1992

[54] MECHANISM FOR ESTIMATING ES/NO FROM PSEUDO ERROR MEASUREMENTS

[75] Inventors: Darrell R. Gimlin, Melbourne Beach; William C. Adams, Jr., Indialantic; Michael P. O'Reilly, Melbourne, all of Fla.

[73] Assignee: Harris Corporation, Melbourne, Fla.

[21] Appl. No.: 484,032

[22] Filed: Feb. 22, 1990

[51] Int. Cl.⁵ .............................................. H04L 27/00
[52] U.S. Cl. ............................. 375/10; 375/94; 375/99; 375/76
[58] Field of Search ..................... 375/10, 94, 99, 76; 371/5.2, 5.3, 5.1; 341/200

[56] References Cited

U.S. PATENT DOCUMENTS

| | | | |
|---|---|---|---|
| 4,259,740 | 3/1981 | Snell et al. | 375/99 |
| 4,654,854 | 3/1987 | Heppe | 371/43 |
| 4,862,483 | 8/1989 | Clark | 375/94 |

Primary Examiner—Douglas W. Olms
Assistant Examiner—Ralph Smith
Attorney, Agent, or Firm—Evenson, Wands, Edwards, Lenahan & McKeown

[57] ABSTRACT

In a digital data recovery receiver, an optimal (in the Maximum likelihood sense) estimate of Es/No (dB) is obtained by the following mechanism. First, over a prescribed symbol span of N symbols, for each of $2^{B-1}-1$ quantization bins, respectively associated with $2^{B-1}$ threshold levels used by a B-bit resolution analog-to-digital converter to digitize a received signal, the number of times that the received signal is quantized with respect to that level is counted. Each count total is divided by the number N of symbols in the span, to obtain plural ratios, respectively representative of probalities of symbol pseudo error rate over the symbol span. Using these ratios, respective Es/No (dB) values are derived from stored pseudo error relationships, each of which is associated with a respective one of the $2^{B-1}-1$ quantization bins and defines the probability of symbol error rate in terms of Es/No (dB). Employing each derived Es/No (dB) value to a maximum likelihood estimate of Es/No (dB), a set of weights, respectively associated with respective Es/No (dB) values, is produced. Each weight is multiplied by its associated Es/No (dB) value and the products are summed, so as to obtain an output signal representative of an estimate of $10\log_{10}$ of the ratio of received energy per symbol Es to noise power density spectra No. This output signal may then be used in a feedback loop to the transmitter site to control one or more characteristics of the transmitted signal, so as to attain a prescribed signal quality in the recovered signal.

13 Claims, 11 Drawing Sheets

MECHANISM FOR ESTIMATING ES/NO FROM PSEUDO ERROR MEASUREMENTS

FIELD OF THE INVENTION

The present invention relates in general to communication systems and is particularly directed to a mechanism for generating an estimate of the ratio of received energy per symbol (Es) to noise power density spectra (No), in the course of monitoring a quantized data stream.

BACKGROUND OF THE INVENTION

It is desirable for digital communication receivers to monitor estimated bit error rate (BER) while receiving unknown data. A method for accomplishing this is to estimate the ratio of received energy per symbol (Es) to noise power density spectra (No), from which BER may be estimated This ratio (Es/No) can also be used to obtain a measurement of other related operational characteristics, such as the fade depth of a satellite communications link, so that adjustments of the transmitted signal can be made, as necessary, to maintain received signal quality within predefined standards. A popular technique for estimating signal quality based on Es/No estimates is called the "Alpha-Flunk" technique. Its operation and limitations are described below. An improved technique which is the subject of this invention (hereafter called the "Beta-Flunk" technique) is then described in detail.

Typically, as diagrammatically illustrated in FIG. 1, the output of a receiver demodulator 10 is digitized (to some prescribed code resolution) by an analog-digital converter (ADC) 12, which uses a plurality of threshold or quantizing levels, in order to accommodate (soft decision) error correction decoding of received encoded data (via decoder 14). To derive an estimate of Es/No, and thereby bit error rate, the quantized data signal may be coupled to what is known as an "Alpha-flunk" signal processing mechanism executed by signal processor 16, which examines the contents of a selected one of a set of sample bins, each of which extends over a respectively different quantization range. For example, for a quantizer using three quantization thresholds, a first (low level) bin may encompass all symbols that have been quantized with respect to the lowest quantization level. A second (medium level) bin may encompass all symbols quantized with respect to the next lowest or medium level, plus all the symbols quantized in the first bin; namely the second bin is cumulative of the first bin. Also employed is third bin, which encompasses all symbols processed at each of the first, or lowest threshold level, the second, or medium threshold level and a third, or high threshold level, so that like the second bin, the third bin is cumulative (of all three bins). Then, using the count total of a selected one of the (three) bins as a result of quantizing successive received signals, the alpha flunk processor infers the probability of bit error, or bit error rate (BER).

More particularly, for an arbitrary digital communication signal, such as a BPSK signal, and assuming an equal likelihood of the transmission of a 'zero' or a 'one', a probability density function (PDF) of the output of the (analog-digital converter) quantizer may have two weighted normal densities 21, 22, as graphically shown in FIG. 2. The AGC feedback loop of the receiver maintains mean values of the component densities at $-1$ and $+1$, as shown, and the standard deviation of both component densities is $1/(2Es/No)^{1/2}$. Also depicted in FIG. 2 are uniform stepsize quantizer threshold values Qth occurring at increments of 0.25, for a three bit quantizer.

In general, if the quantizer has a resolution of B bits, then $2^B - 1$ threshold values I may be denoted by $$I_{(1)} < I_{(2)} < \ldots$$
$$< I_{(2^{B-1}-1)} < I_{(2^{B-1})} = 0 < I_{(2^{B-1}+1)} < \ldots$$
$$< I_{(2^B-1)},$$

where $$I_{(2^{B-1}-J)} = -I_{(2^{B-1}+J)}, J = 1, \ldots, 2^{B-1} - 1.$$

If the quantizer has uniform stepsize, as is typically the case, then the distance between every pair of adjacent threshold values I is the same. For an exemplary transmission of N unknown symbols (binary digits) and N statistically independent random variables (samples) having the probability density function of FIG. 2, let $A_{(1)}$ = the number of Samples in $(-\infty, I_{(1)}]$
$A_{(2)}$ = the number of Samples in $(I_{(1)}, I_{(21)}]$
.
.
.
$A_{(2^B-1)}$ = the number of Samples in $(I_{(2^B-2)}, I_{(2^B-1)}]$
$A_{(2^B)}$ = the number of Samples in $(I_{(2^B-1)}, \infty)$, then the Alpha-Flunk technique utilizes cumulative sums of these N statistically independent random variables to estimate Es/No (dB). Since the transmitted symbols are unknown, the sign bit may be discarded and the random variables $$X_{(1)} = \frac{A_{(2^{B-1})} + A_{(2^{B-1}+1)}}{N}$$

.
.
.

$$X_{(2^{B-1})} = \frac{A_{(1)} + A_{(2^B)}}{N}$$

are utilized to estimate Es/No. The cumulative sums $X_{(1)}, X_{(1)} + X_{(2)}, \ldots X_{(1)} + X_{(2)} + \ldots + X_{(2^{B-1}-1)}$ are estimates of the probabilities of the events:

$$\{|\text{Demod Output}| \leq I_{(2^{B-1}+1)}\} \quad (3)$$
$$\{|\text{Demod Output}| \leq I_{(2^{B-1}+2)}\}$$
.
.
.
$$\{|\text{Demod Output}| \leq I_{(2^B-1)}\}$$

where the |·| notation indicates the "absolute value" operation.

These probabilities, which may be denoted as $$P_{(1)}, P_{(2)}, \ldots, P_{(2^{B-1}-1)},$$

respectively, are related to Es/No (dB) through the Q, or error, functions and are plotted, in FIG. 3, versus Es/No (dB) for the quantizer characteristic depicted in FIG. 2. In FIG. 3, the curve leftmost is the usual symbol error rate curve. Thus, there exists a set of relationships between various "pseudo errors" (or "Alpha-Flunks") and Es/No (dB), where $Es/No(dB) = g_{(i)}(P_{(i)})$, $i = 1, \ldots, 2^{B-1} - 1$.

As a result of demodulating N unknown symbols, the random variables or estimates of Es/No (dB) may be expressed as:

$$\widehat{Es/No(dB)}_{(i)} = g_{(i)}(X_{(1)} + \ldots + X_{(i)}), \quad i = 1, \ldots, 2^{B-1} - 1 \quad (4)$$

These values are the Alpha-Flunk estimates of Es/No (dB). If N is sufficiently large, Es/No (dB)$_{(i)}$ may be approximated as:

$$\widehat{Es/No(dB)}_{(i)} \approx D_{(i)}((X_{(1)} + \ldots + X_{(i)}) - P_{(i)}) + Es/No(dB), \quad (5)$$

where:

$$D_{(i)} = \frac{dg_{(i)}}{dP_{(i)}} \quad (6)$$

Equation (6) is represented in FIG. 3 by projection line 25 from the y-axis PDF onto the x-axis through the relationship Es/No (dB) = $g_{(1)}$ ($P_{(1)}$). By a linearizing approximation, the variance of the estimate $\widehat{Es/No}$ $\overline{(dB)}_{(i)}$ may be expressed as:

$$D_{(i)}^2 P_{(i)}(1 - P_{(i)})/N. \quad (7)$$

Each Alpha-Flunk estimate variance depends on the actual value of Es/No (dB) through $P_{(i)}$ and $D_{(i)}$. As a result, the best Alpha-Flunk estimate is obtained by choosing the one with the least variance. It should be observed that this is not an exact process, since the actual $P_{(i)}$ and $D_{(i)}$ must be estimated through the relationship $g_{(i)}$ and the observed value of $$X_{(1)} + \ldots + X_{(i)}.$$

(Notice that $E($
$X_{(1)} + \ldots + X_{(i)} = P_{(i)})$. If two estimates have nearly the same variance, the wrong estimate might be chosen. However, the variance estimate error is reasonably insensitive to typical errors in the estimate of $P_{(i)}$, for the best of the Alpha-Flunk estimates, over a limited range of Es/No. Therefore, a close-to-the-minimum variance (or "best") Alpha-Flunk estimate can be expected through this process, over a limited Es/No range.

A major shortcoming of the above-described "Alpha-Flunk" technique for estimating Es/No (dB) is that it utilizes only a portion of the information available in the probability density characteristic. As a result, the Alpha-Flunk estimator provides accurate results only over a limited range of Es/No values. Using all of the available information would result in more precise estimates of Es/No, as well as an extended dynamic range of the estimator. This latter method, hereafter called Beta-Flunk, is the subject of this invention, as described below.

SUMMARY OF THE INVENTION

In accordance with the present invention, a more precise estimate of Es/No (dB) (compared to the Alpha-Flunk technique) is obtained by utilizing, simultaneously, the information contained in each individual quantization bin, rather than a selected cumulative set of bin values. More particularly, pursuant to the present invention, an estimate of Es/No (dB) is obtained by processing quantization information supplied by the analog-to-digital converter in accordance with the following mechanism. First, over a prescribed symbol span of N symbols, for each of $2^{B-1} - 1$ quantization bins, respectively associated with $2^{B-1} - 1$ threshold levels used by a B-bit resolution analog-to-digital converter to quantize a received signal into digital format, the number of times that the received signal is quantized with respect to that level is counted. Each count total is divided by the number N of symbols in the span, so as to obtain plural ratios, respectively representative of probabilities of occurrence of symbol magnitude ranges over the symbol span. Using each of these ratios, a respective Es/No (dB) value is estimated from a set of stored and analytically derived pseudo-error relationships, each of which is associated with a respective one of the $2^{B-1} - 1$ quantization threshold levels. Employing each derived Es/No (dB) value to a maximum likelihood estimate of Es/No (dB), a set of weights, respectively associated with respective Es/No (dB) values, is produced. Each weight is multiplied by its associated Es/No (dB) value and the products are summed, so as to obtain an output signal representative of an estimate of 10 log$_{10}$ of the ratio of received energy per symbol Es to noise power spectral density No. This output signal may then be used in a feedback loop to the transmitter site to control one or more characteristics of the transmitted signal, so as to attain a prescribed signal quality in the recovered signal.

DETAILED DESCRIPTION

Figure 1:
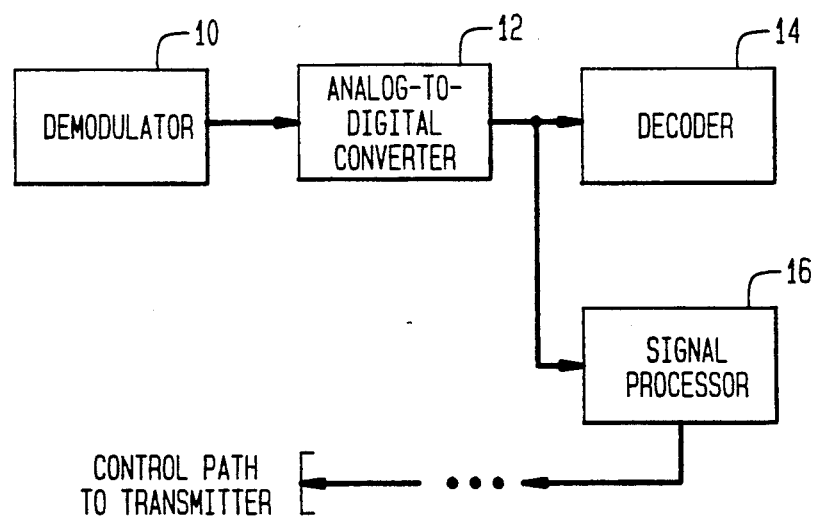
FIG. 1 diagrammatically illustrates a receiver configuration in which the output of a receiver demodulator is digitized by an analog-digital converter for error correction decoding of received encoded data.

Before describing in detail the particular improved mechanism for obtaining an estimate of Es/No (dB), it should be observed that the present invention resides primarily in a novel structural combination of conventional communication and signal/data processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood. In this regard it is to be observed that the present invention is preferably implemented by replacing the 'Alpha-Flunk' signal processing mechanism executed by the control processor 16 of FIG. 1, with the 'Beta-Flunk' mechanism to be described in detail below.

As pointed out above, in accordance with the present invention, a more precise estimate of Es/No (dB) is obtained by utilizing, simultaneously, the information contained in each individual quantization bin, rather than a selected cumulative set of bin values. At the outset it may be noted that the cumulative sums of the quantization bins are highly correlated. As a consequence, the less correlated values $$X_{(1)}, X_{(2)}, \ldots X_{(2^{B-1}-1)}$$

will be utilized instead of the cumulative sums in order to arrive at a more precise estimate of Es/No. ($X_{(2^B-1)}$ contains no additional information since its value is determined by the sum of $X_{(1)}, \ldots X_{(2^{B-1}-1)}$.

In parallel with the above-discussed determination of Alpha-Flunk estimates, it should be observed that $$X_{(1)}, X_{(2)} \ldots, X_{(2^B-1)}$$

are unbiased estimates of the probabilities of the events:

$$\{I_{(2^B-1)} < |\text{Demod Output}| \leq I_{(2^B-1+1)}\} \quad (8)$$

$$\vdots$$

$$\{I_{(2^B-1)} < |\text{Demod Output}| \leq \infty\}$$

Figure 2:
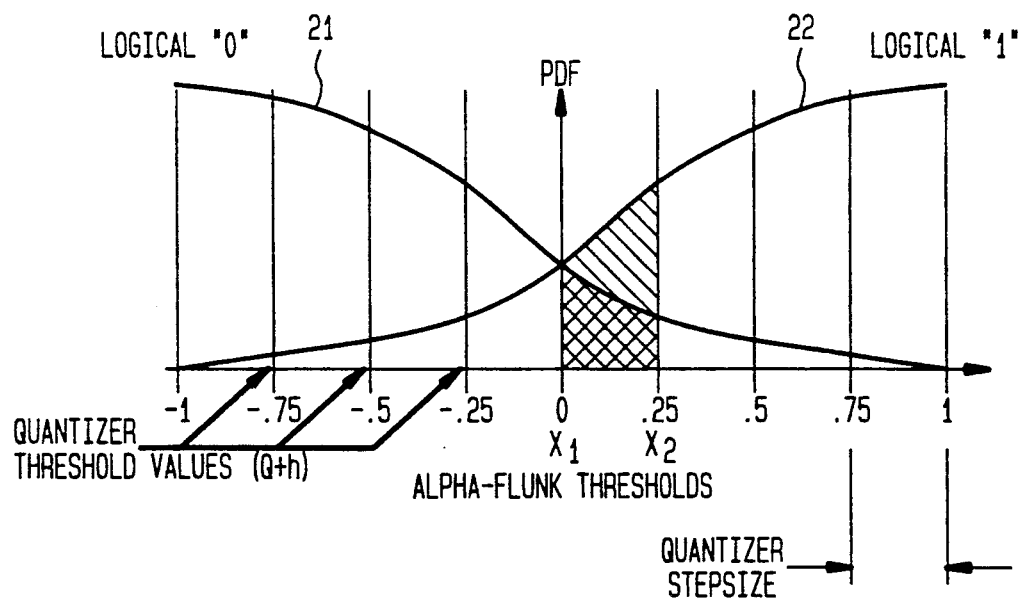
FIG. 2 shows a probability density function (PDF) of the output of a receiver demodulator having a pair of weighted normal densities for a BPSK signal, and analog-to-digital converter threshold.
Figure 4:
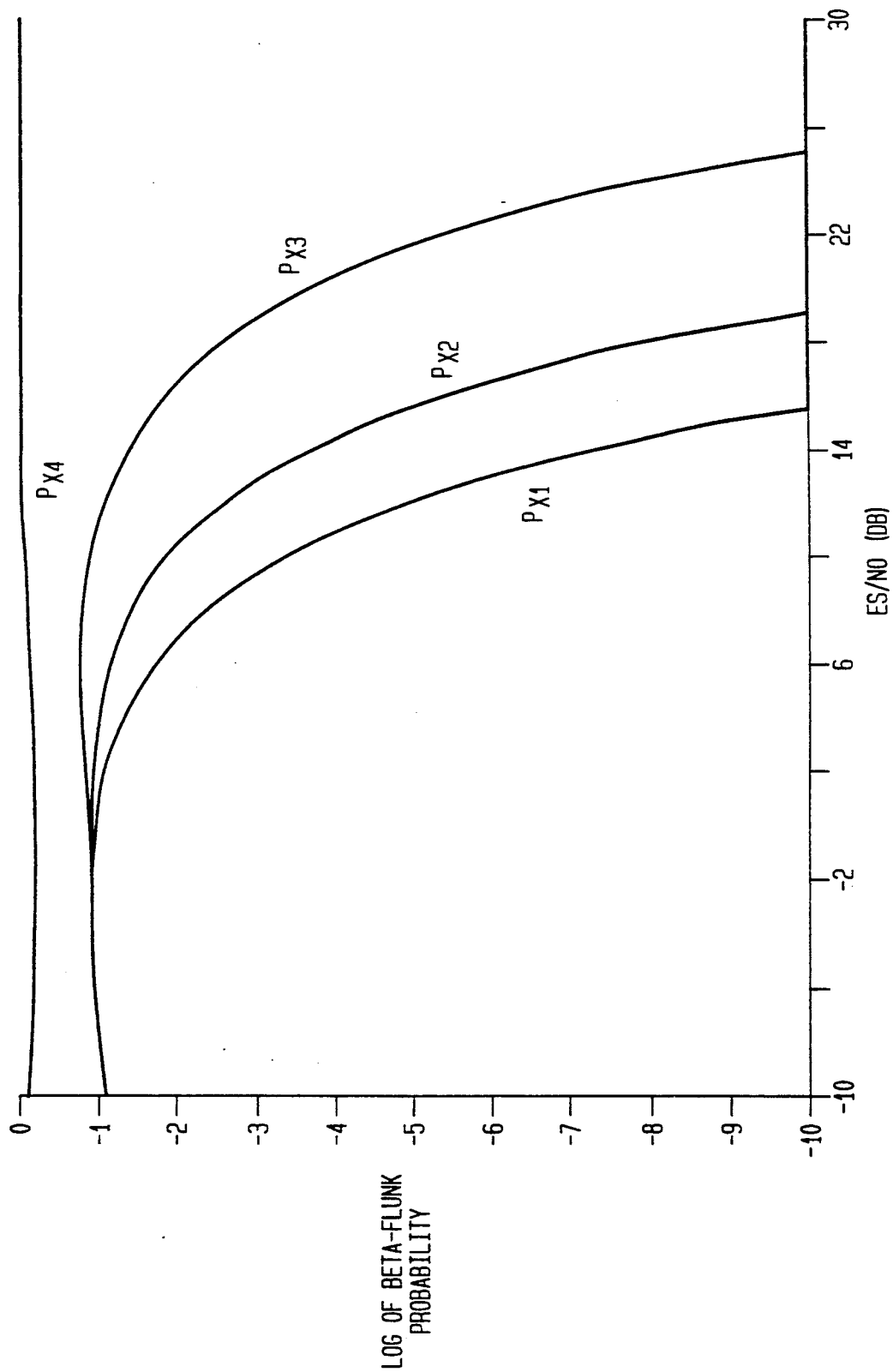
FIG. 4 is a plot of respective probabilities vs Es/No (dB) for bins individually associated with quantizer thresholds of the quantizer PDF characteristic depicted in FIG. 2.

Denoting these probabilities as $P_{(X1)}, P_{(x2)} \ldots, P_{(x2^B-1)}$, respectively, they may be plotted vs Es/No (dB) as shown in FIG. 4, for the quantizer PDF characteristic depicted in FIG. 2. These curves represent relationships between Es/No (dB) and $P_{(Xi)}$, which may be denoted as:

$$Es/No(dB) = h_{(i)}(P_{(Xi)}), i=1, \ldots 2^{B-1} \quad (9)$$

As a result of demodulating N unknown symbols, estimates of Es/No (dB) may be expressed as:

$$\widehat{Es/No(dB)}_{(i)} = h_{(i)}(X_{(i)}), i=1, \ldots, 2^{B-1} \quad (10)$$

If N is sufficiently large, $\widehat{Es/No (dB)}_{(i)}$ may be approximated as:

$$\widehat{Es/No(dB)}_{(i)} \approx S_{(i)}(X_{(i)} - P_{(Xi)}) + Es/No(dB), \quad (11)$$

where:

$$S_{(i)} = \frac{dh_{(i)}}{dP_{(Xi)}} \quad (12)$$

As will be described below, an estimate of Es/No (dB) may be derived in the form:

$$\widehat{Es/No (dB)} = \sum_{i=1}^{2^{B-1}-1} b_{(i)} h_{(i)}(X_{(i)}) \quad (13)$$

$$\approx \left\{ \sum_{i=1}^{2^{B-1}-1} b_{(i)} S_{(i)}(X_{(i)} - P_{(Xi)}) \right\} + Es/No (dB)$$

An expression for $b_{(i)}$ in equation (13) may be derived for any number of bits, B, which results in an unbiased estimate having a variance less than or equal to the variance of the "best" Alpha-Flunk estimate.

More particularly, an estimate of Es/No (dB) that is a linear combination of the $\overline{Es/No\ (dB)}_{(i)} = h_{(i)}(X_{(i)})$ may be derived by determining the maximum likelihood estimate (MLE) of Es/No (dB) under the large sample approximation that $h_{(i)}(X_{(i)})$ are jointly normal random variables. The indicated MLE is then found by maximizing, with respect to Es/No (dB), the logarithmic likelihood function LLF.

$$LLF = -1/2(2^{B-1}-1)\ln(2\pi) - 1/2\ \ln(Det\ K) \\ -1/2(\underline{h}\text{-}\underline{Eso}\ (dB)/\ )^T K^{-1}(\underline{h}\text{-}\underline{Eso}\ (dB)/\ ) \quad (14)$$

In equation (14), h is a column vector with elements $$h_{(i)}(X_{(i)}), i=1, \ldots, 2^{B-1}-1,$$

$\underline{Eso}$ (dB)/ is a column vector with elements all equal to $\overline{Es/No}$ (dB), K is the covariance matrix of the $h_{(i)}(X_{(i)})$, with the i-jth element denoted by Cov $\{h_{(i)}, h_{(j)}\}$, Det K is the determinant of K, and $K^{-1}$ is the inverse of K. The random variables N $X_{(i)}$ have the multinomial distribution with the probabilities $P_{(X1)}, P_{(X2)}, \ldots, P_{(X2^B-1)}$. Using known moments for the multinomial distribution (as described in a text by W. Feller entitled: "An Introduction to Probability Theory and Its Applications, Volume 1", second Edition, John Wiley and Sons, Inc., New York, 1957), and the linearizing approximation for the $h_{(i)}$, an expression for Cov $\{h_{(i)}, h_{(j)}\}$ may be derived as:

$$Cov\{h_{(i)}, h_{(j)}\} = \begin{cases} S_{(i)} S_{(i)} \frac{P_{(Xi)}(1 - P_{(Xi)})}{N}, & i = j \\ -S_{(i)} S_{(j)} \frac{P_{(Xi)} P_{(Xj)}}{N}, & i \neq j \end{cases} \quad (15)$$

Taking the derivative of the log likelihood function LLF with respect to Es/No (dB), setting the result equal to zero and solving for Es/No (dB), the maximum likelihood estimate may be expressed as:

$$Es/No\ (dB)_{(MLE)} = \sum_{i=1}^{2^{B-1}-1} b_{(i)} h_{(i)}(X_{(i)}), \quad (16)$$

where,

-continued $$b_{(i)} = \left(\sum_{j=i}^{2^{B-1}-1} K_{ij}^{-1}\right) \bigg/ \left(\sum_{i=1}^{2^{B-1}-1} \sum_{j=1}^{2^{B-1}-1} K_{ij}^{-1}\right), \quad (17)$$

and $K_{ij}^{-1}$ denotes the i-jth element of $K^{-1}$.

An expression for $b_{(i)}$ that is valid for arbitrary B can be algebraically derived. Letting $$S = \sum_{i=1}^{2^{B-1}-1} (1/S_{(i)}, = -(1/S_{(2^{B-1})})) \quad (18)$$

and, $$a_{(i)} = (S + (P_{(X2^{B-1})}/(S_{(i)}P_{(Xi)})))/S_{(i)} \quad (19)$$

then, $$b_{(i)} = a_{(i)} \bigg/ \sum_{i=1}^{2^{B-1}-1} a_{(i)} \quad (20)$$

This result is very significant because the coefficients $b_{(i)}$ can be found for arbitrary B without inverting the covariance matrix K.

Since, $$\sum_{i=1}^{2^{B-1}-1} b_{(i)} = 1, \quad (21)$$

the estimate is unbiased. Notice that, all other things being equal, as $S_{(i)}$ becomes large, $b_{(i)}$ becomes small. This is expected, since large $S_{(i)}$ means that $h_{(i)}$ will be a poor estimate in the sense of having a large variance. Also, all other things being equal, decreasing $P_{(Xi)}$ causes increasing $b_{(i)}$. This is also consistent with what may be expected since decreasing $P_{(Xi)}$ (below $P_{(Xi)}=1/2$) means $h_{(i)}$ will have decreasing variance.

In the above derivation of the MLE and the coefficients $b_{(i)}$, it was assumed that $S_{(i)}$ and $P_{(Xi)}$ are known. In practice, the values of $X_{(i)}$ are used to estimate $P_{(Xi)}$. These estimates of $P_{(Xi)}$ are also used to look-up estimates of $S_{(i)}$. As it was of little consequence to estimate the variance of Alpha-Flunk estimates in order to pick the best one, it is still only of second order consequence to estimate the parameters $b_{(i)}$. In other words, the effect of estimating the $b_{(i)}$ appears to be negligible. Where precision is important, $S_{(i)}$ values tend to vary slowly with respect to the $P_{(Xi)}$. The product $S_{(i)}P_{(Xi)}$, appearing in the expression (19) for $a_{(i)}$ turns out to change slowly with respect to $P_{(Xi)}$. Although the above comments may not be obvious from the mathematical expressions, they have been observed to be true from processing actual signal values.

Comparison of Beta-Flunk estimate performed with respect to Alpha-Flunk performance has shown Beta-Flunk processing to provide estimates of Es/No (dB) that are at least as good as and sometimes significantly better than the best Alpha-Flunk estimate, using the same quantizer signal values. More particularly, the Beta-Flunk estimate variance is given by:

$$E\left\{\sum_{i=1}^{2^{B-1}-1} \sum_{j=1}^{2^{B-1}-1} b_{(i)}b_{(j)}S_{(i)}S_{(j)}(X_{(i)} - P_{(Xi)})(X_{(j)} - P_{(Xj)})\right\} \quad (22)$$

A computer program was written to evaluate this result and compare it to the corresponding Alpha-Flunk estimate variances for arbitrary N, B and stepsize. The 95% confidence error, $1.96 \times$ Standard Deviation, was plotted for each estimate as a function of Es/No (dB). The meaning of 95% confidence error is that with probability=0.95, the estimate will be within $\pm$ the 95% confidence error of the true value of Es/No (dB). The value N=76800 was used in all the numerical results discussed below. This provides a common value for comparison purposes. The results can be easily scaled to a new N, since variances are inversely proportional to N, while standard deviations and confidence errors are inversely proportional to $(N)^{1/2}$.

Figure 3:
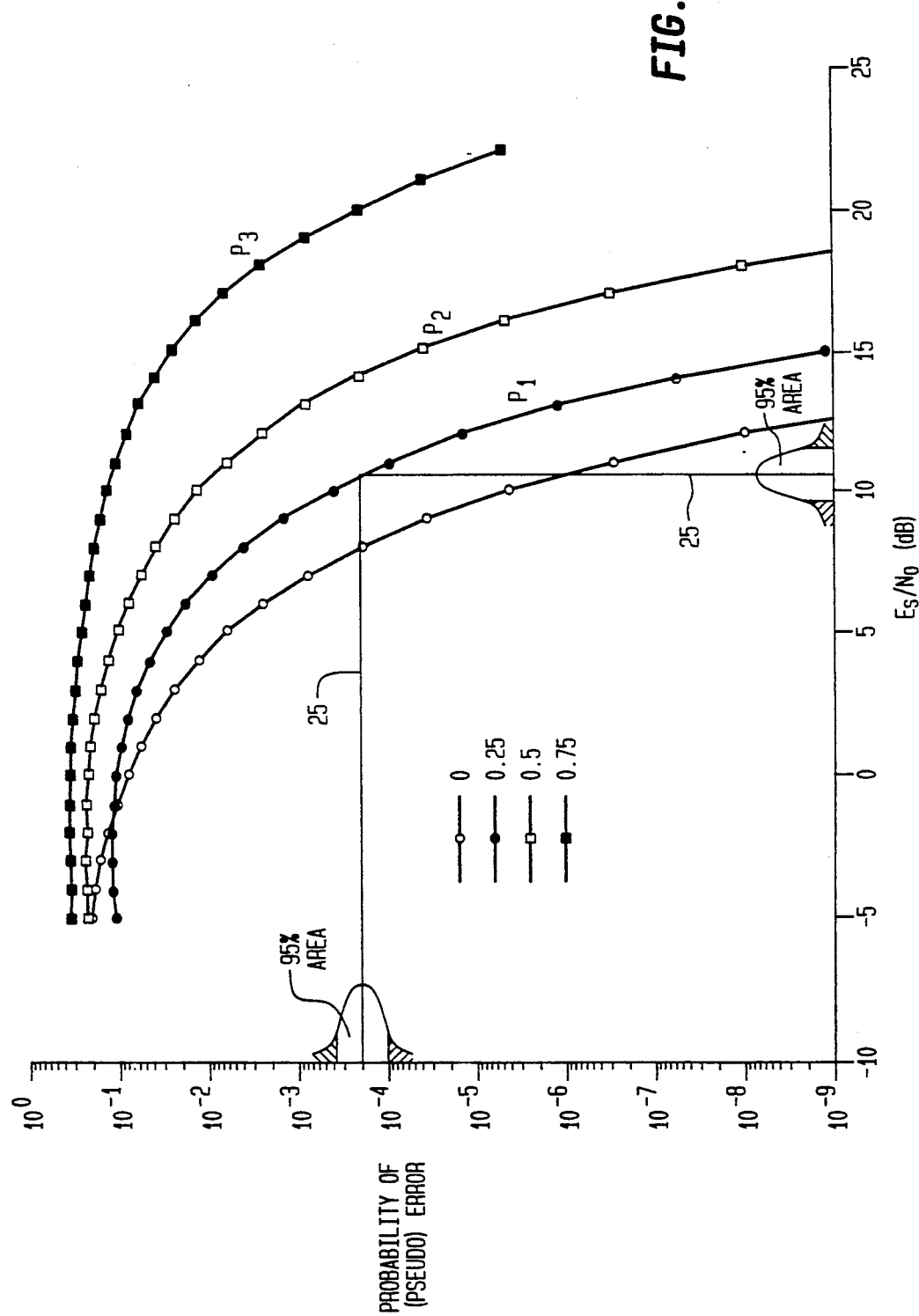
FIG. 3 is a plot of probability of pseudo error vs. Es/No (dB) for successively larger (cumulative) quantizer bins associated with the quantizer characteristic of FIG. 2.
Figure 5:
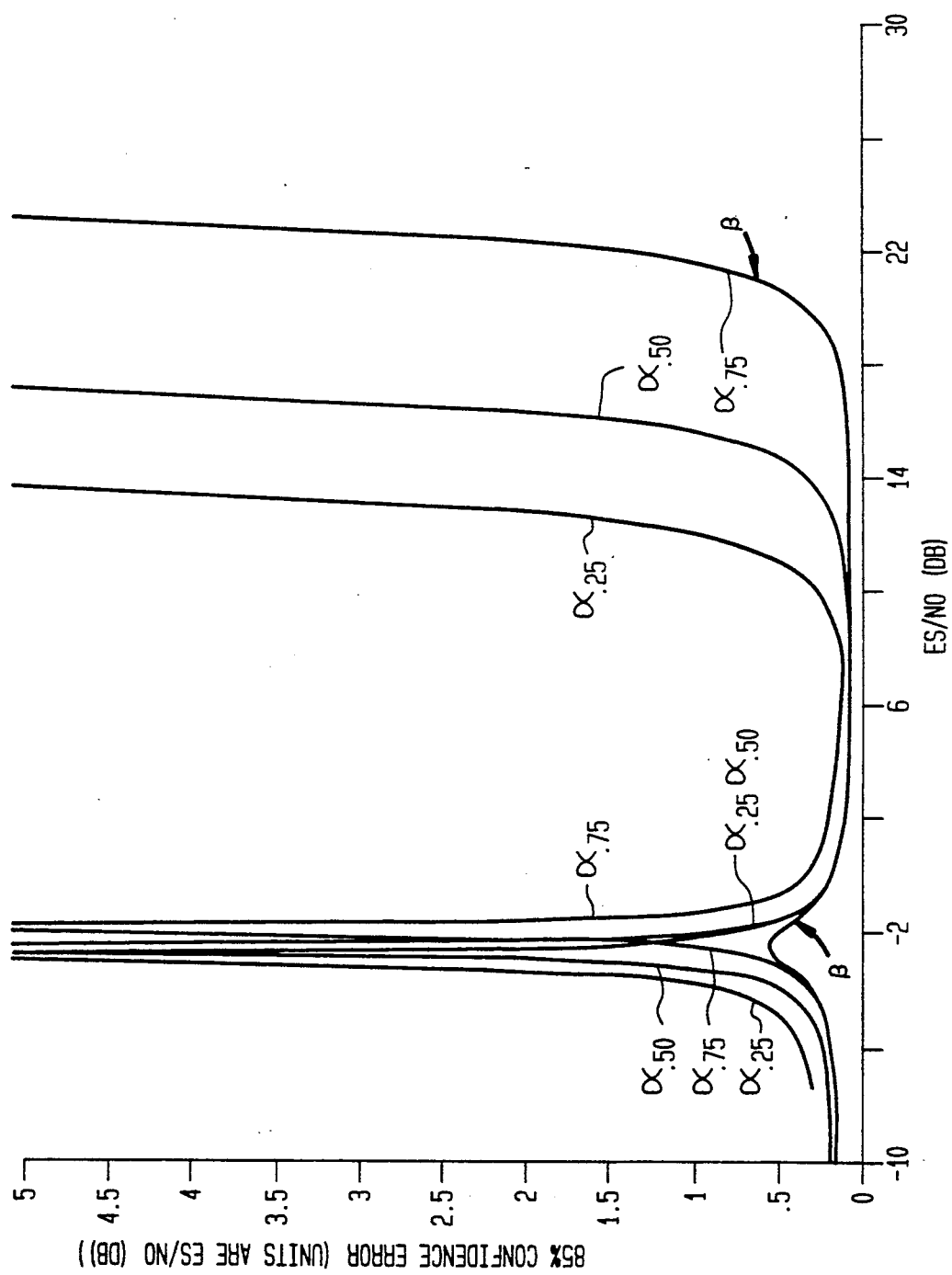
FIGS. 5-7 show Alpha-Flunk ($\alpha$) and Beta-Flunk ($\beta$) performance curves for a three bit quantizer with stepsize = 0.25, having the PDF/illustrated in FIG. 2.
Figure 6:
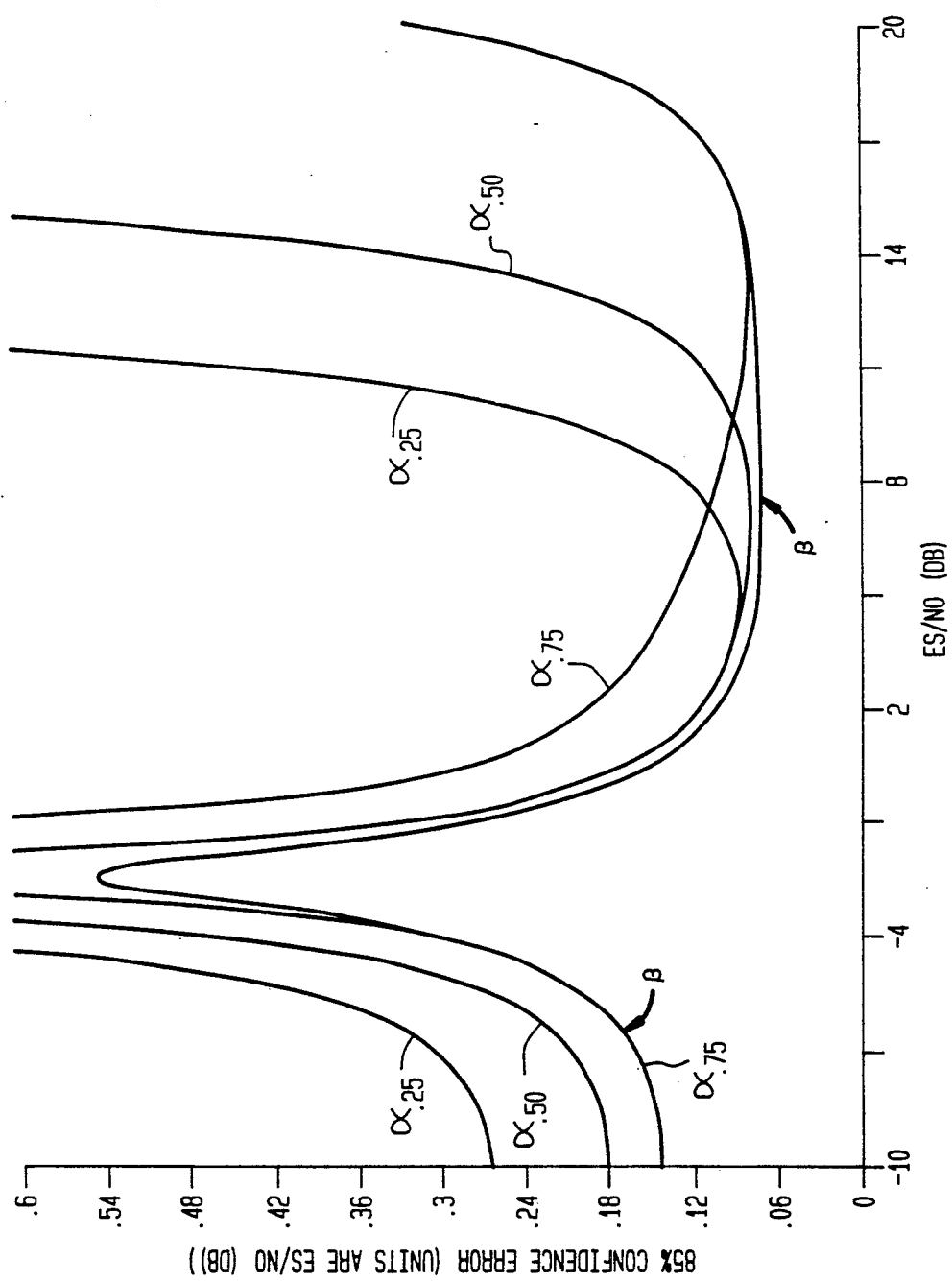
Figure 7:
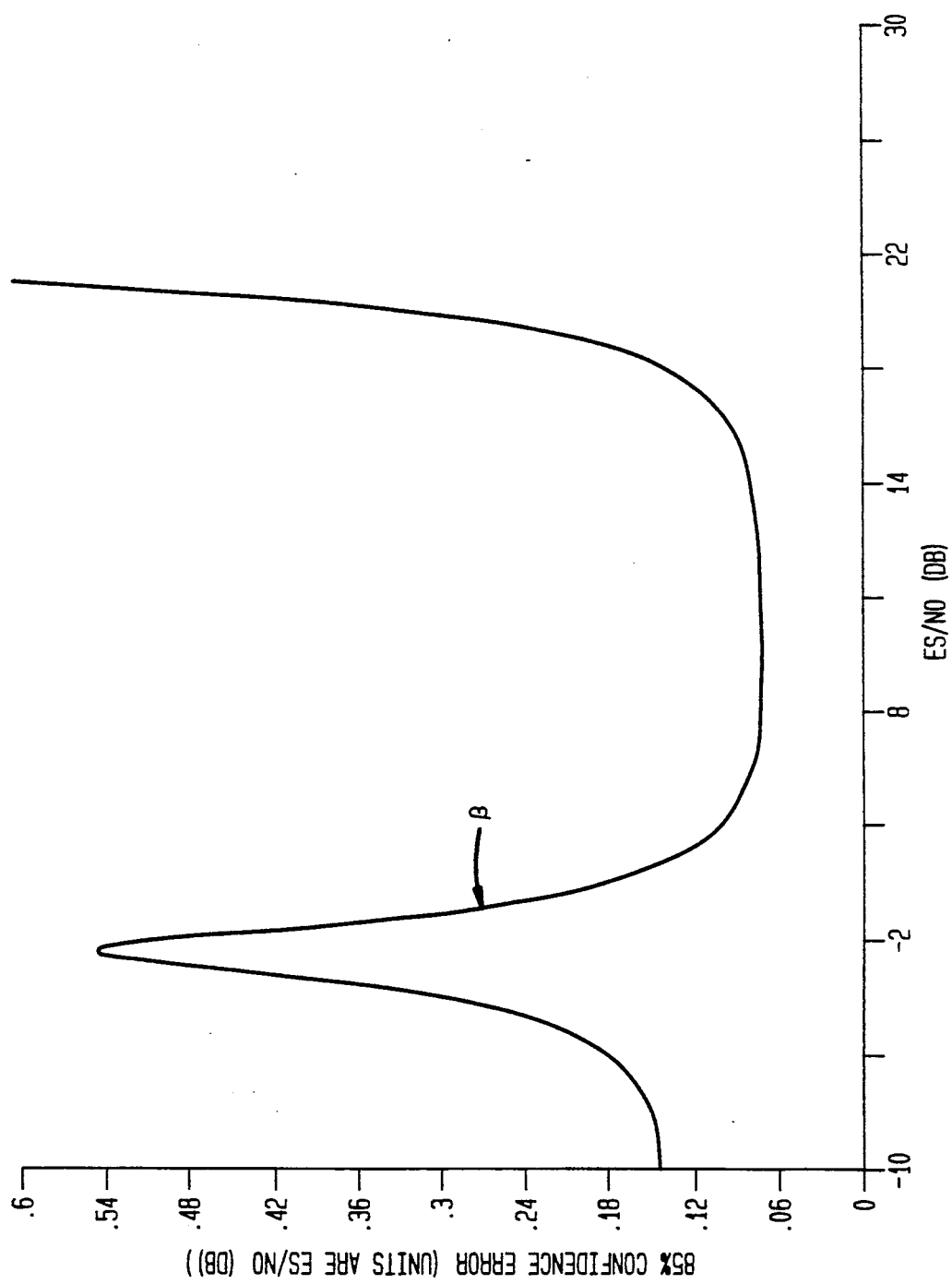

FIGS. 5-7 show Alpha-Flunk ($\alpha$) and Beta-Flunk ($\beta$) performance curves for a three bit quantizer with stepsize=0.25, having the PDF illustrated in FIG. 2. As can be seen, Beta-Flunk estimation ($\beta$) is always at least as good as the best Alpha-Flunk estimate ($\alpha$) and for some Es/No values, it is significantly better. The error peak around Es/No= $-2.5$ dB is due to the points of zero slope in the curves of FIGS. 3 and 4. Beta-Flunk performance is significantly better in this region and around Es/No=10.5 dB. Useful performance terminates when Es/No becomes so large that there is negligible rate of change, with Es/No of the probability of the demodulator output falling in any of the regions (intervals of the real line) being utilized.

Figure 8:
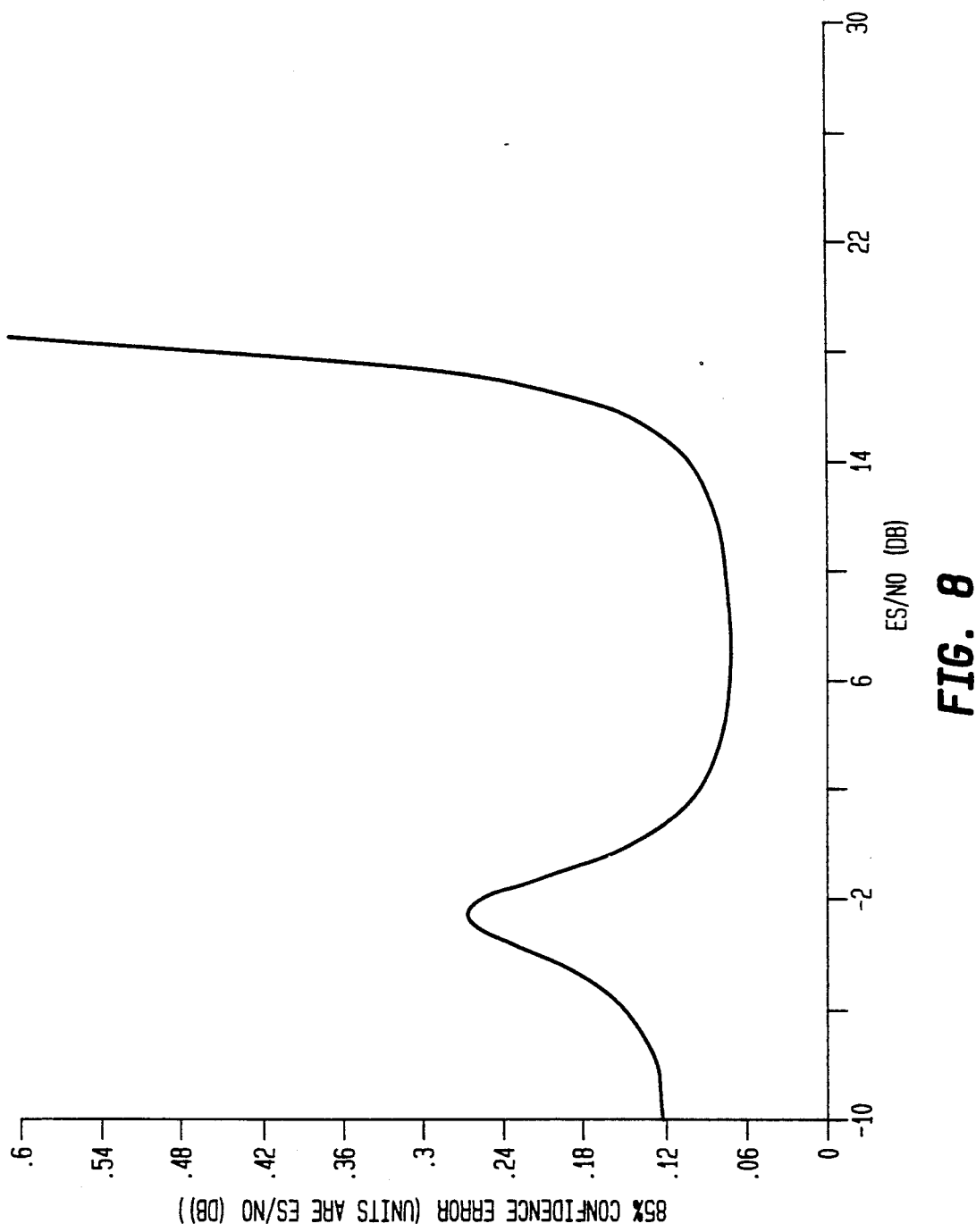
FIG. 8 is a performance curve for Beta-Flunk associated with an increased step size, with the uppermost utilized region having its upper end point at 1.

The error peak at $-2.5$ dB can be reduced considerably by increasing the stepsize (stepsize=$1/(2^{(B-1)}-1)$ rather than $1/2^{(B-1)}$, so that the uppermost utilized region has its upper end point at 1. The resulting performance is plotted in FIG. 8 which may be compared to FIG. 7. The price paid for improved performance around Es/No= $-2.5$ dB is that satisfactory performance terminates at a lower Es/No in the high-value Es/No region. This comparison demonstrates that the performance characteristic can be tailored somewhat to the application needs without changing the number of bits used for quantization.

Figure 9:
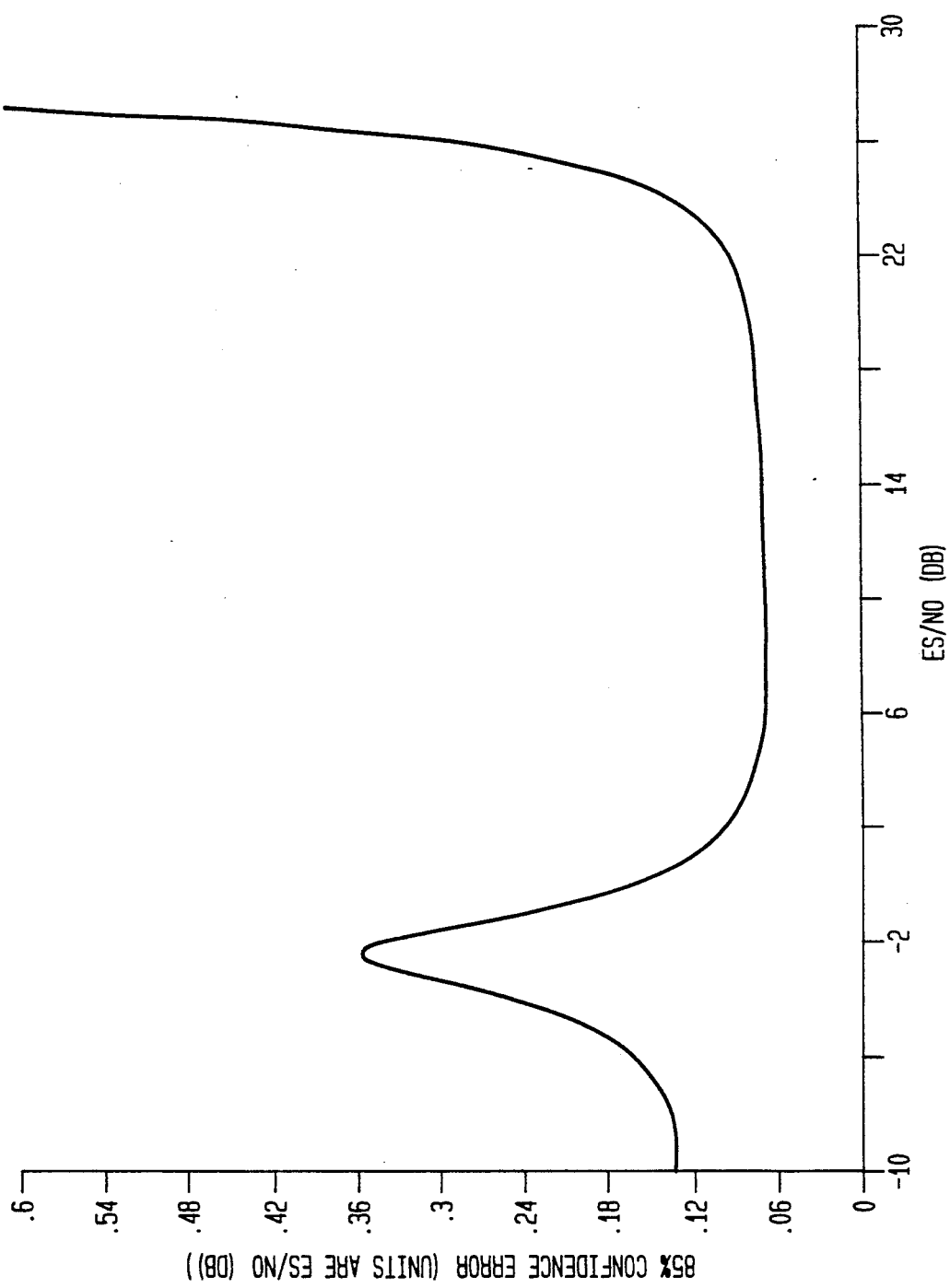
FIGS. 9-11 are performance curves for B = 4, 5 and 6 and stepsize = $1/2^{(B-1)}$.
Figure 10:
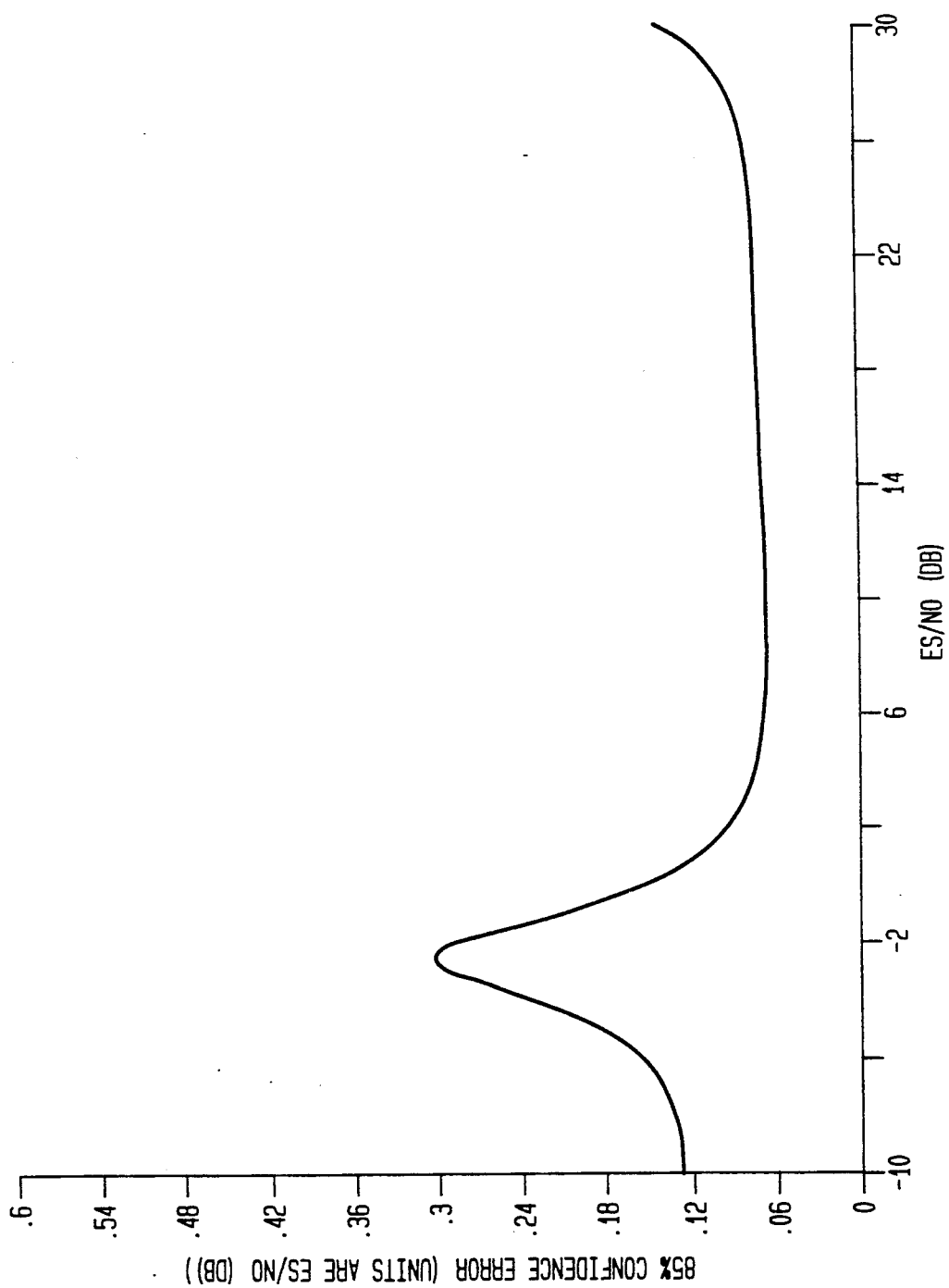
Figure 11:
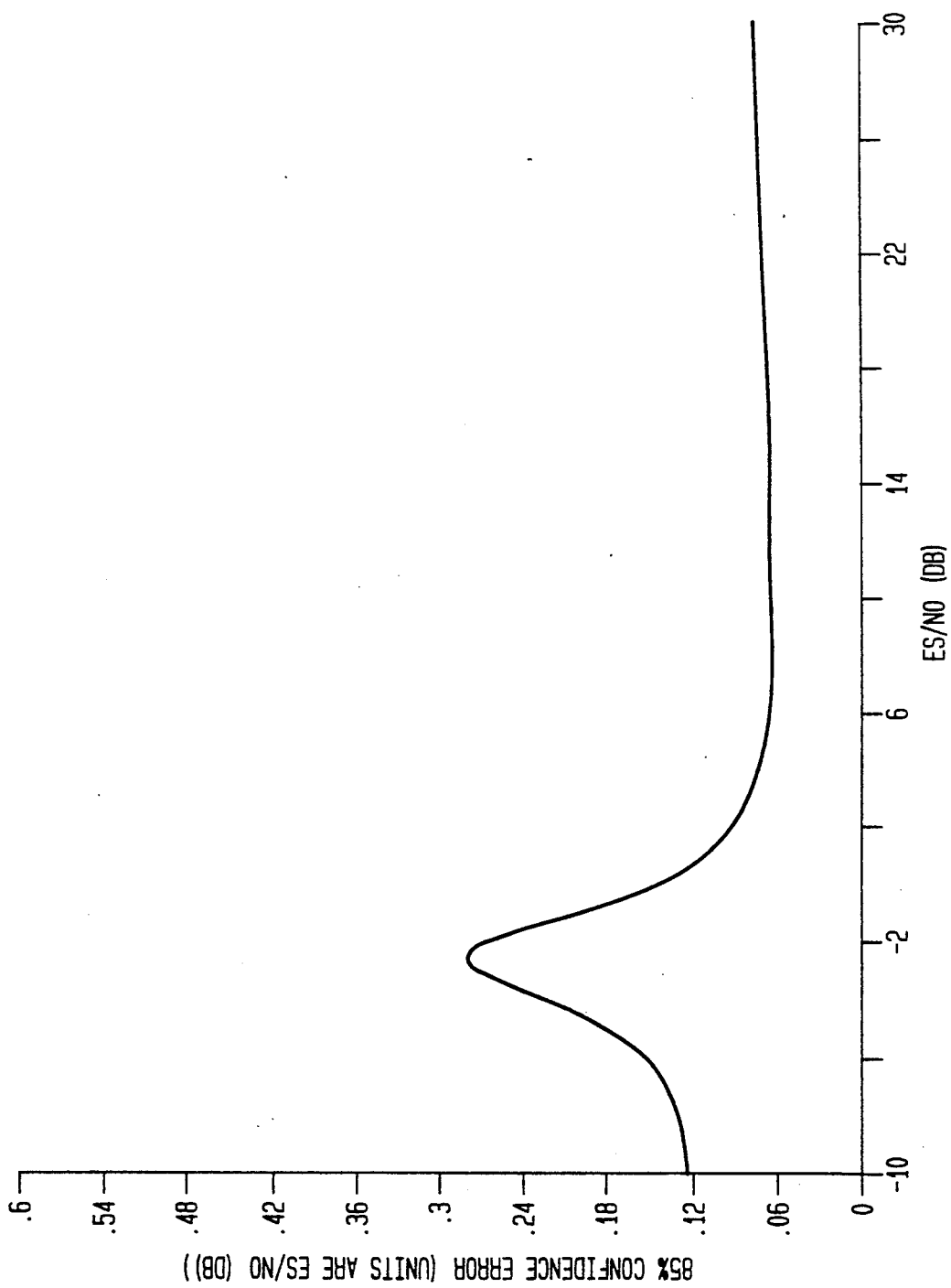

Performance curves for B=4, 5 and 6 and stepsize=$1/2^{(B-1)}$ are given in FIGS. 9 through 11, respectively. As B increases, satisfactory performance extends to higher Es/No and the error peak around $-2.5$ dB is reduced, while performance at intermediate Es/No is essentially unchanged. Even though more regions are being introduced with increasing B, $S_{(i)}$ and $P_{(Xi)}$ behave in such a way that the estimate variance is not reduced for intermediate values of Es/No. If B is increased by 1, the number of regions double, the values of $P_{(Xi)}$ are approximately halved, and the $S_{(i)}$ are approximately doubled. This suggests that the use of a nonuniform stepsize quantizer with smaller steps at the upper end would improve performance characteristics.

Figure 12:
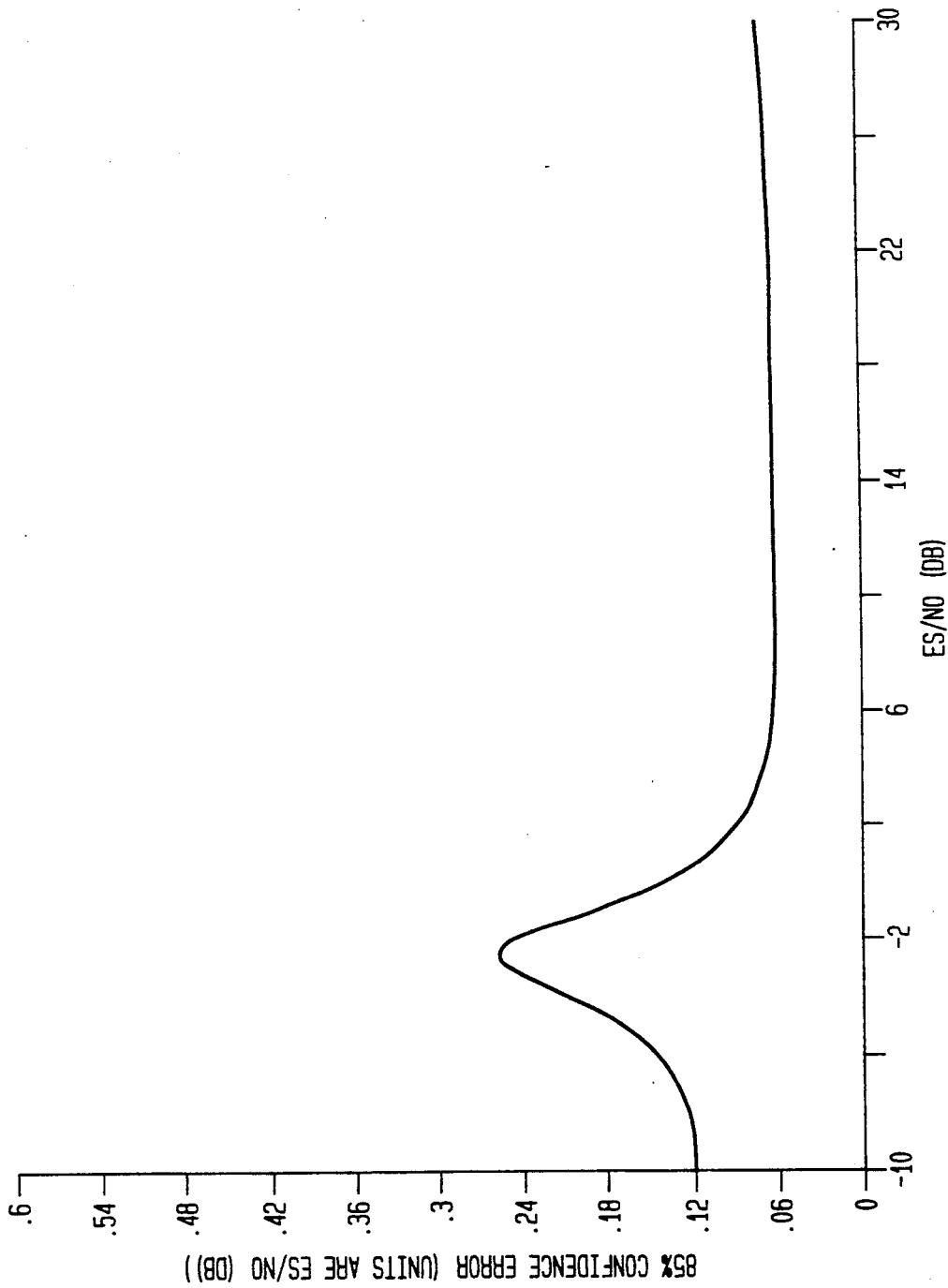
FIG. 12 shows the performance characteristics with 6 bit quantization and stepsize = $1/(2^{(B-1)} - 1)$.

FIG. 12 shows the performance characteristics with 6 bit quantization and stepsize=$1/(2^{(B-1)}-1)$. A comparison can be made with FIG. 11 where stepsize=$1/2^{(B-1)}$. The results are similar, but not as dramatic, as in FIGS. 7 and 8 for 3 bit quantization.

As noted above, the Beta-Flunk signal processing mechanism provides estimates of Es/No (dB) that are at least as good (and sometimes significantly better) than the best Alpha-Flunk estimate using the same quantizer information. The Beta-Flunk mechanism automatically takes care of combining the selected quantizer information to estimate Es/No (dB), weighting each piece of information in accordance with its reliability and statistical dependence to other information. As explained previously, the count output values produced by the quantizer are coupled as inputs to look up tables to obtain derivative estimates, $S_{(i)}$, and the individual estimates of Es/No (dB), $h_{(i)}$. These quantizer counts and derivative estimates are then used in the specified relationships for deriving the coefficients $b_{(i)}$ which are then used to combine the $h_{(i)}$. No computationally intensive calculations are required and the look up tables for the $S_{(i)}$ and $h_{(i)}$ may represent measured rather than theoretical modem curves.

As will be appreciated from the foregoing description, because the Beta-Flunk mechanism utilizes simultaneously the information contained in each individual quantization bin, rather than a selected cumulative set of bin values, the present invention is able to provide a very precise estimate of Es/No (dB), so that adjustments to the operation of a transmitter site, based upon this estimate, may considerably improve the signal quality at the receiver.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a communications receiver in which a received signal is quantized into a digital signal in accordance with a plurality of threshold levels, a method for generating an output representative of an estimate of $10\log_{10}$ of the ratio of received energy per symbol Es to noise power spectral density No comprising the steps of:
   (a) over a sequence of received symbols and for pairs of threshold levels in accordance with which said received signal is quantized, generating a set of ratios of respective counts of the number of times that the received signal magnitude is quantized between adjacent pairs of threshold levels to the number of symbols in said sequence;
   (b) for each of the ratios generated in step (a), deriving a respective Es/No (dB) estimate from a set of relationships, each of which is associated with a respective threshold level pair and defines the probability of symbol pseudo errors in terms of Es/No (dB);
   (c) weighting each of the Es/No (dB) estimates derived in step (b) in accordance with a maximum likelihood estimate of Es/No (dB) based upon the Es/No (dB) estimates derived in step (b); and
   (d) combining the weighted estimates of step (c), so as to obtain an output representative of an estimate of the ratio of received energy per symbol Es to noise power spectral density No.

2. A method according to claim 1, wherein said received signal is quantized in accordance with a plurality of B-bit resolution quantizer and wherein step (a) comprises, for $2^{B-1}$ threshold levels in accordance with which said received signal magnitude is quantized, generating a set of $2^{B-1}-1$ ratios of respective counts of the number of times that said received signal magnitude is quantized between an adjacent pair of threshold levels to the number of symbols in said sequence.

3. A method according to claim 2, wherein step (b) comprises, for each of the $2^{B-1}-1$ ratios generated in step (a), deriving a respective Es/No (dB) estimate from said set of relationships.

4. A method according to claim 3, wherein step (c) comprises weighting each of the $2^{B-1}-1$ Es/No (dB) estimates derived in step (b).

5. A method according to claim 4, wherein step (d) comprises summing the $2^{B-1}-1$ weighted estimates of step (c), so as to obtain an output representative of an estimate of $10\log_{10}$ of the ratio of received energy per symbol Es to noise power spectral density No.

6. For use with a communications receiver in which a received signal is quantized into a digital signal in accordance with a B-bit resolution quantizer, a method for generating an output representative of an estimate of $10\log_{10}$ of the ratio of received energy per symbol Es to noise power spectral density No comprising the steps of:
   (a) quantizing a plurality N of successive symbols using said B-bit resolution quantizer;
   (b) for respective $2^{B-1}$ pairs of adjacent threshold levels used to quantize said received signal in step (a), counting the number of times that the received signal magnitude is quantized between pairs of adjacent threshold levels;
   (c) dividing the respective counts of step (b) by the number N of symbols of said plurality, so as to obtain plural ratios, respectively representative of probabilities of symbol pseudo error rate over said plurality N of successive symbols using said plural ones of said threshold values to quantize the symbols;
   (d) for each of the ratios obtained in step (c), deriving, from a set of relationships, each of which is associated with a respective one of said plural threshold levels and defines the probability of symbol pseudo error rate in terms of Es/No (dB), a respective Es/No (dB) estimate;
   (e) weighting each of the Es/No (dB) estimates derived in step (d) in accordance with a maximum likelihood estimate of Es/No based upon the respective Es/No (dB) estimates derived in step (d); and
   (f) summing the weighted estimates of step (e), so as to obtain an output representative of an estimate of $10\log_{10}$ of the ratio of received energy per symbol Es to noise power spectral density No.

7. For use with a communications system in which a signal transmitted over a communication link from a transmitter site to a receiver site is processed at said receiver site to recover transmitted symbol information by quantizing the received signal into digital format in accordance with a plurality of threshold levels, a method for controlling the transmitted signal so as to attain a prescribed signal quality in the processed signal comprising the steps of:
   (a) over a sequence of received symbols and for threshold levels in accordance with which the magnitude of said received signal is quantized, generating a set of ratios of respective counts of the number of times that said received signal magnitude is quantized between said pair of threshold levels to the number of symbols in said sequence;
   (b) for each of the ratios generated in step (a), deriving a respective Es/No (dB) estimate from a set of relationships, each of which is associated with a respective threshold level and defines the probability of symbol pseudo errors in terms of Es/No (dB);
   (c) weighting each of the Es/No (dB) estimates derived in step (b) in accordance with a maximum likelihood estimate of Es/No (dB) based upon the Es/No (dB) estimates derived in step (b);

(d) combining the weighted estimates of step (c), so as to obtain an output representative of an estimate of the ratio of received energy per symbol Es to noise power spectral density No; and (e) adjusting at least one characteristic of said transmitted signal in accordance with the output generated in step (d).

8. For use with a communications receiver in which a received signal is quantized by a digital-to-analog converter into a digital signal in accordance with a plurality of threshold levels, an apparatus for generating an output representative of an estimate of $10\log_{10}$ of the ratio of received energy per symbol Es to noise power spectral density No comprising the steps of:

first means, coupled with said digital-to-analog converter, for generating a set of ratios of respective counts of the number of times that the magnitude of said received signal is quantized, between respective pairs of threshold levels of said analog-to-digital converter, to the number of symbols in a prescribed sequence of received symbols;

second means for storing a set of relationships, each of which is associated with a respective threshold level pair and defines the probability of symbol pseudo errors in terms of Es/No;

third means for deriving from said second means, for each of the ratios generated by said first means, a respective Es/No (dB) estimate;

fourth means for weighting each of the Es/No (dB) estimates derived by said third means in accordance with a maximum likelihood estimate of Es/No based upon the derived Es/No estimates; and fifth means for combining the weighted estimates, so as to obtain an output representative of an estimate of $10\log_{10}$ of the ratio of received energy per symbol Es to noise power spectral density No.

9. An apparatus according to claim 8, wherein said received signal is quantized by said analog-to-digital converter in accordance with a plurality of $2^{B-1}$ threshold levels and wherein said first means comprises means for generating, for each of said $2^{B-1}-1$ bins, a set of $2^{B-1}-1$ ratios of respective counts of the number of times that the magnitude of said received signal is quantized between threshold levels to the number of symbols in said sequence.

10. An apparatus according to claim 9, wherein said third means comprises means for deriving a respective Es/No (dB) estimate from said set of relationships, for each of the $2^{B-1}-1$ ratios generated by said first means.

11. An apparatus according to claim 10, wherein said fourth means comprises means for weighting each of the $2^{B-1}-1$ Es/No (dB) estimates.

12. An apparatus according to claim 11, wherein said fifth means comprises means for summing the $2^{B-1}-1$ weighted estimates, so as to obtain an output representative of an estimate of $10\log_{10}$ of the ratio of received energy per symbol Es to noise power spectral density No.

13. For use with a communications system in which a signal transmitted over a communication link from a transmitter site to a receiver site is processed at the receiver site to recover transmitted symbol information by quantizing the received signal into digital format in accordance with a plurality of threshold levels, an apparatus for deriving an output signal representative of an estimate of the ratio of received energy per symbol Es to noise power spectral density No, said output signal being used to control the transmitted signal so as to attain a prescribed signal quality in the signal processed at the receiver site comprising:

first means for generating a set of ratios of respective counts of the number of times that the magnitude of said received signal is quantized between pairs of threshold levels to the number of symbols in said sequence over a prescribed sequence of received symbols;

second means for storing data representative of a set of relationships, each of which is associated with a respective pair of threshold levels and defines the probability of symbol pseudo errors in terms of Es/No;

third means for accessing, from said second means, a respective data value representative of a Es/No estimate for each of the ratios generated by said first means;

fourth means for weighting each of the Es/No estimate values accessed by said third means in accordance with a maximum likelihood estimate of Es/No (dB);

fifth means for combining the weighted estimate values, so as to obtain said output signal representative of an estimate of the ratio of received energy per symbol Es to noise power density spectra No.

* * * * *